US009349066B2

(12) United States Patent
Koo et al.

(10) Patent No.: US 9,349,066 B2
(45) Date of Patent: May 24, 2016

(54) OBJECT TRACKING AND PROCESSING

(75) Inventors: Hyung-Il Koo, Seoul (KR); Kisun You, Suwon (KR); Young-Ki Baik, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 615 days.

(21) Appl. No.: 13/567,412

(22) Filed: Aug. 6, 2012

(65) Prior Publication Data
US 2013/0177203 A1 Jul. 11, 2013

Related U.S. Application Data

(60) Provisional application No. 61/584,062, filed on Jan. 6, 2012.

(51) Int. Cl.
*G06K 9/00* (2006.01)
*G06K 9/36* (2006.01)
*H04N 5/225* (2006.01)
*G06K 9/32* (2006.01)

(52) U.S. Cl.
CPC .......... *G06K 9/3258* (2013.01); *G06K 9/00664* (2013.01); *G06K 9/00671* (2013.01); *G06K 9/325* (2013.01); *G06K 2209/01* (2013.01)

(58) Field of Classification Search
None
See application file for complete search history.

(56) References Cited

U.S. PATENT DOCUMENTS

| 6,608,930 B1 * | 8/2003 | Agnihotri et al. ............. 382/176 |
| 6,754,389 B1 * | 6/2004 | Dimitrova et al. ............ 382/224 |
| 7,171,046 B2 | 1/2007 | Myers et al. |
| 7,787,705 B2 * | 8/2010 | Sun et al. ....................... 382/270 |
| 8,009,928 B1 * | 8/2011 | Manmatha et al. ............ 382/283 |
| 8,037,496 B1 * | 10/2011 | Begeja et al. ..................... 725/53 |
| 2003/0043172 A1 * | 3/2003 | Li et al. ........................... 345/636 |
| 2006/0120629 A1 * | 6/2006 | Myers et al. ................... 382/321 |
| 2008/0240497 A1 * | 10/2008 | Porikli ....................... G06T 7/20 382/103 |
| 2009/0019009 A1 * | 1/2009 | Byers ................. G06F 17/30796 |
| 2010/0054585 A1 | 3/2010 | Guillou et al. |
| 2010/0259676 A1 | 10/2010 | Swan |
| 2013/0114849 A1 * | 5/2013 | Pengelly et al. .............. 382/103 |

OTHER PUBLICATIONS

Gargi, et al., "A System for Automatic Text Detection in Video", Proceedings of the Fifth International Conference on Document Analysis and Recognition, 1999. ICDAR '99, Bangalore, India, Sep. 20, 1999, pp. 29-32.
Jung, et al.,"Text Information Extraction in Images and Video: A Survey", Pattern Recognition—The Journal of the Pattern Recognition Society, Elsevier, vol. 37, No. 5, May 1, 2004, pp. 977-997.
Li, et al., "Automatic Text Detection and Tracking in Digital Video", IEEE Transactions on Image Processing, vol. 9, No. 1, Jan. 1, 2000, pp. 147-156.

(Continued)

*Primary Examiner* — Matthew Bella
*Assistant Examiner* — Jose M Torres
(74) *Attorney, Agent, or Firm* — Toler Law Group, PC

(57) ABSTRACT

A method includes tracking an object in each of a plurality of frames of video data to generate a tracking result. The method also includes performing object processing of a subset of frames of the plurality of frames selected according to a multi-frame latency of an object detector or an object recognizer. The method includes combining the tracking result with an output of the object processing to produce a combined output.

45 Claims, 9 Drawing Sheets

(56) References Cited

OTHER PUBLICATIONS

Li, et al., "Automatic Text Tracking in Digital Videos", 1998 IEEE Second Workshop on Multimedia Signal Processing, Redondo Beach, CA, Dec. 7, 1998, pp. 21-26.

Lienhart, et al., "Localizing and Segmenting Text in Images and Videos", IEEE Transactons on Circuits and Systems for Video Technology, vol. 12, No. 4, Apr. 1, 2002, pp. 256-268.

Wernicke, et al., "On the Segmentation of Text in Videos", IEEE International Conference on Multimedia and Expo, vol. 3, Jul. 30, 2000, pp. 1511-1514.

International Search Report and Written Opinion for International Application No. PCT/US2012/065887 mailed Jun. 6, 2013, 13 pp.

Li H., et al., "Automatic Text Detection and Tracking in Digital Video", Technical Report: LAMP-TR-028/CFAR-TR-900/CS-TR-3962, University of Maryland, College Park, Dec. 1998, pp. 1-38.

Huang Xiaodong., "Automatic Video Text Detection and Localization Based on Coarseness Texture", 2012 Fifth International Conference on Intelligent Computation Technology and Automation (ICICTA), Jan. 12-14, 2012, pp. 398-401.

Zhen Wang, et al., "An Efficient Video Text Recognition System", 2010 Second International Conference on Intelligent Human-Machine Systems and Cybernetics (IHMSC), Aug. 26-28, 2010, vol. 1, pp. 174-177.

\* cited by examiner

OBJECT TRACKING AND PROCESSING

CLAIM OF PRIORITY UNDER 35 U.S.C. §119

The present application for patent claims priority to Provisional Application No. 61/584,062 entitled "Object Tracker and Recognizer" filed Jan. 6, 2012, and assigned to the assignee hereof and hereby expressly incorporated by reference herein.

I. FIELD

The present disclosure is generally related to image processing.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player.

Text detection and recognition may be performed by a computing device (e.g., a wireless telephone) to identify text in an image that has been captured by a camera of the device. Sometimes the captured text may be in motion relative to the camera (e.g., text on a moving vehicle) and it may be necessary to track the text as the text moves while providing accurate identification of the text.

III. SUMMARY

An object processing and tracking technique may perform both object tracking and object processing (e.g., object detection, object recognition, or any combination thereof) to accurately identify an object (e.g., text) from video data and to track a location of the identified object. The tracking and the processing may overlap or at least partially overlap in time (e.g., the tracking or portions of the tracking method may be performed concurrently with the processing or a portion of the processing method), and results of processing text (e.g., results of the detection and/or recognition of text) may be combined with the results of the tracking to generate state information of the text.

Unlike conventional text information extraction techniques that utilize localization and recognition of text in a single image, the proposed technique may utilize localization and recognition of text in a video stream to improve user experience and to improve performance of the object tracking and detection system (e.g., higher text recognition response rates). By performing localization and recognition of text in a video stream, rather than in a single image, the proposed technique may also provide real-time experience to the user and may reduce false alarm rates (i.e., incorrect text detection in the video stream). In addition, the proposed technique exploits temporal information between frames of the video stream to achieve increased text detection accuracy.

In a particular embodiment, a method includes tracking an object in each of a plurality of frames of video data to generate a tracking result. The method also includes performing object processing of a subset of frames of the plurality of frames selected according to a multi-frame latency of an object detector or an object recognizes. The method includes combining the tracking result with an output of the object processing to produce a combined output.

In another particular embodiment, an apparatus includes a tracker configured to track an object in each of a plurality of frames of video data to generate a tracking result. The apparatus also includes an object processor configured to process the object in a subset of frames of the plurality of frames selected according to a multi-frame latency of the object processor. The apparatus includes a temporal filter configured to combine the tracking result of the tracker with an output of the object processor to produce a combined output.

Particular advantages provided by at least one of the disclosed embodiments include the ability to perform object tracking and object detection with high accuracy by utilizing a tracking technique having a high frame rate and low latency in conjunction with an object detection and/or recognition technique.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
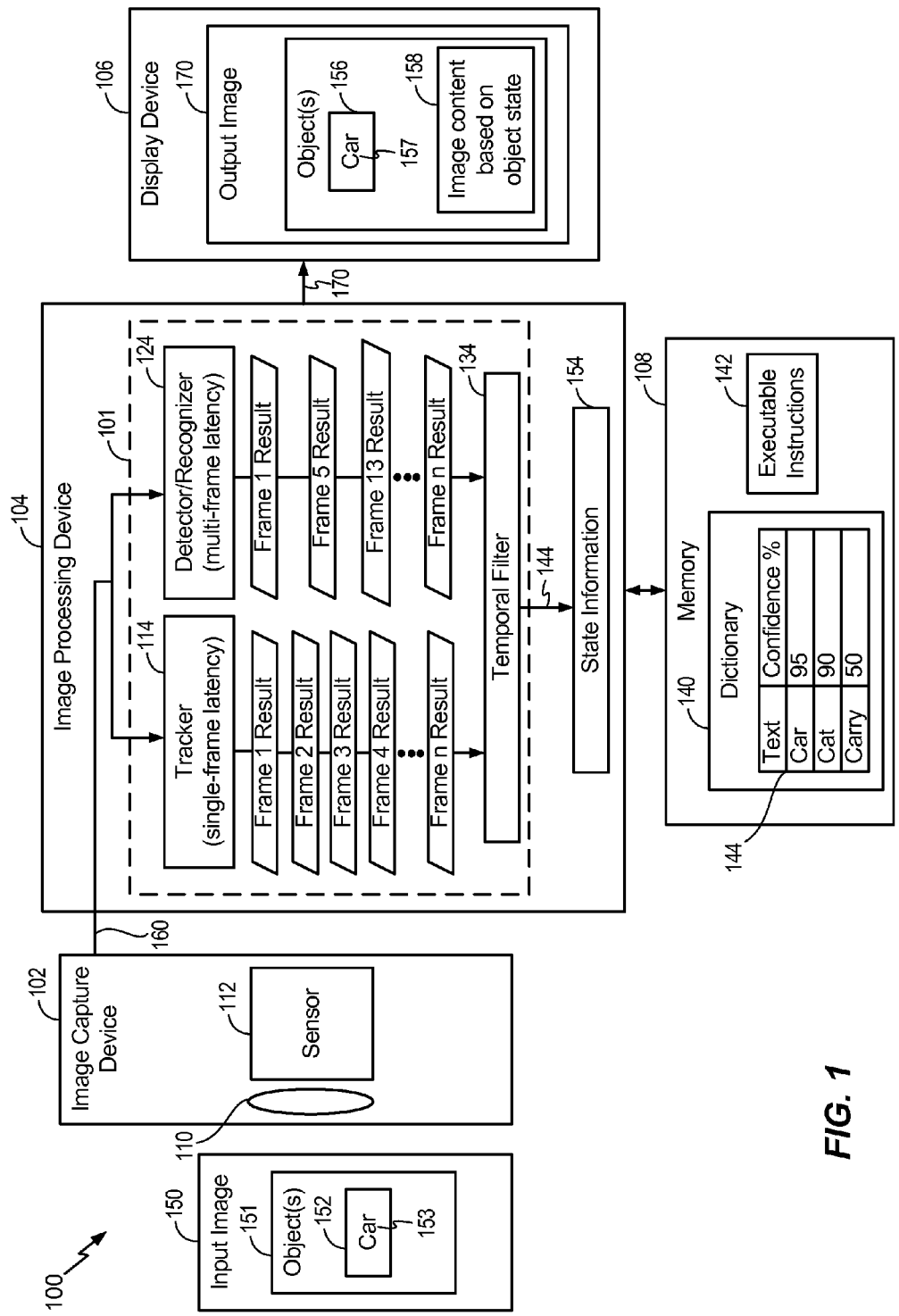
FIG. 1 is a block diagram of a particular embodiment of a system to perform object tracking and processing.

Text localization may be performed during object (i.e., text) tracking and recognition in a video stream that includes a plurality of video frames. Text localization may be performed to locate text regions within an input video stream. Given the t-th frame $I_t$ in a video stream, a set of text boxes in the video stream may be denoted as:

$$X_t = \{x_t^i\}_{i=1}^{N_t}, \quad \text{(Eq. 1)}$$

where $N_t$ is the number of text boxes and $x_t^i$ represents the i-th box. Each text box may be modeled as a parallelogram. Further, each text box may be denoted as:

$$x_t^i = (p_t^i, q_t^i, r_t^i, s_t^i) \in p, \quad \text{(Eq. 2)}$$

where p, q, r, and s are the four sides of the parallelogram. In addition, $B(x_t^i)$ may represent a region in the video frame corresponding to $x_t^i$. $X_t$ may represent a hidden state (i.e., an unknown state or location) of the set of text boxes that may be estimated from observations. In a conventional single image based algorithm, only detection results from the single image are considered to obtain the location of the text box $X_t$. In the single image based algorithm, the detection result may be denoted as:

$$Z_t = \{Z_t^i\}_{i=1}^{M_t} \text{ where } Z_t^i \in p. \tag{Eq. 3}$$

The single image based algorithm of Eq. 3 does not exploit additional information such as temporal information of a text box. However, given a video stream, additional information such as temporal information may be exploited. For example, temporal information may be utilized to estimate an optimal location of text boxes by using a series of observations $Z_{0:t}$ of the text boxes, where the series of observations $Z_{0:t}$ may be denoted as:

$$Z_t, Z_{t-1}, Z_{t-2}, \ldots, Z_0. \tag{Eq. 4}$$

Thus, the location of a text box (or set of text boxes) $X_t$ may be estimated from a sequence of observations (i.e., $Z_t, Z_{t-1}, Z_{t-2}, \ldots, Z_0$). The above described estimation may be formulated recursively in a Bayesian filtering framework as:

$$P(X_t \mid Z_{0:t-1}) = \int P(X_t \mid X_{t-1}) P(X_{t-1} \mid Z_{0:t-1}) dX_{t-1} \tag{Eq. 5a}$$

$$P(X_t \mid Z_{0:t}) = \frac{p(Z_t \mid X_t) P(X_t \mid Z_{0:t-1})}{\int P(Z_t \mid X_t) P(X_t \mid Z_{0:t-1}) dX_{t-1}}, \tag{Eq. 5b}$$

where Eq. 5a is a predictive step and Eq. 5b is a filtering (or update) step. Accordingly, $X_t$ may be estimated based on Eq. 5a and Eq. 5b. After estimating $X_t$ (i.e., determining the location of the text box), words in each text box may also be estimated (i.e., text in the text boxes may be determined). The word estimation step may be performed using a filtering algorithm described below.

In a particular embodiment a temporal filtering algorithm may include utilizing multiple Kalman trackers in conjunction with data association techniques. It should be noted that conventional multi-object detection and tracking methods may not be suitable for estimating locations of text boxes because text boxes are generally not highly interactive objects like humans (e.g., athletes in a sports game, pedestrians), and animals (e.g., ants). Thus, the temporal filtering algorithm may be used to perform multi-object detection and tracking for text boxes in a video stream.

The dynamics of a text box may be represented as:

$$x_t^i = A_{t-1}^i(x_{t-1}^i) + n_t^i, \tag{Eq. 6}$$

where $A_{t-1}^i(\bullet)$ models the motion (i.e., local motion) of the text box between adjacent frames of the video stream and $n_t^i$ is drawn from zero-mean multivariate normal distributions with covariance $Q_t = \sigma_1^2 I$. In estimating $A_{t-1}^i(\bullet)$, image features may be used rather than motion history (e.g., autoregressive model) because motion of text boxes may be reliably estimated using image features.

A corner detection method may be implemented to detect points of interest in an image. For example, a FAST (Features from Accelerated Segment Test) corner detection method may be used to extract corners of a region $B(x_{t-1}^i)$ in the t−1th frame $I_{t-1}$. Subsequently, corresponding points of the FAST corners extracted in the region $B(x_{t-1}^i)$ may be determined in the t-th frame $I_t$ using a Lucas-Kanade algorithm. Next, transformations for the text box from the corresponding points may be estimated using a robust motion estimation technique that includes RANSAC (Random Sample Consensus) algorithm and DLT (Direct Linear Transformation) algorithm. In particular, it may be assumed that motion of the text box may be approximated with a similarity transform. When the transform around $B(x_{t-1}^i)$ is denoted as:

$$x \to Ax + b, \tag{Eq. 7}$$

for $A \in R^{2 \times 2}$ and $b \in R^2$, then $A_{t-1}^i(x_{t-1}^i)$ is:

$$A \begin{vmatrix} p_{t-1}^j \\ q_{t-1}^j \\ r_{t-1}^j \\ s_{t-1}^j \end{vmatrix} + \begin{vmatrix} b \\ b \\ b \\ b \end{vmatrix}, \tag{Eq. 8}$$

where $x_{t-1}^i = [p_{t-1}^i, q_{t-1}^i, r_{t-1}^i, s_{t-1}^i]$. The measurement equation may be expressed as:

$$z_t^{ji} = x_t^i + m_t^i \tag{Eq. 9}$$

where $z_t^{ji}$ is a detection result corresponding to the i-th tracker and $m_t^i$ is drawn from a zero-mean multivariate normal distribution with covariance $R_t = \sigma_2^2 I$.

Assigning an observation $z_t^{ji} (\in Z_t)$ to the i-th tracker, as shown in Eq. 9, may pose a data association problem. To address the data association problem, a matching function is developed to yield a scalar value between a tracker and a detection result. Since $$\tilde{x}_t^i = A_{t-1}^i(x_{t-1}^i) \tag{Eq. 10}$$

is a predicted location of the object (i.e., the text box) at the t-th frame, a matching function may be defined between the i-th tracker and the j-th observed text box as a normalized overlapping area expressed as:

$$M(i, j) = \frac{|B(\tilde{x}_t^i) \cap B(z_t^j)|}{|B(\tilde{x}_t^i) \cup B(z_t^j)|}. \tag{Eq. 11}$$

In data association, considering a pair showing $M(i, j) \geq 0.8$, an observation is assigned to a tracker in a greedy manner.

After data association has been performed, independent Kalman filters may be utilized. A new Kalman filter may be initiated when a detection result does not correspond to an existing tracker and a tracker (i.e., an output of the tracker) is disregarded when a motion of the tracker is not determined (e.g., due to a small number of inliers). However, when a motion estimation is successful (i.e., $A_{t-1}^i$ is available) and a new observation is assigned to a tracker, the states (i.e., state information) may be updated using the Kalman filter. It should be noted that unlike conventional methods based on low-level image features, detection results may sometimes not be assigned to a tracker (i.e., when a motion estimation is unsuccessful or unavailable). In cases where there are missing observations, we set $\sigma_2 = \infty$, meaning that measurement update is skipped.

Based on the above described data association method and Kalman filtering, a set of trackers may be obtained corresponding to a set of observations. Optical character recognition (OCR) may be performed for available observations to determine the words (i.e., actual texts) in the text boxes. Among n recent OCR results for each Kalman filter, the most frequent word is considered as the word in the corresponding tracker. In case of a tie, a result is not assigned.

To improve precision (i.e., to reduce a number of false alarms), a particular text box is shown (or displayed) only when the particular text box is detected in at least m times in recent n frames. Assuming that the detection probability of a text box is p, this technique may improve precision of text box detection. The improved precision may be expressed as:

$$f(p, n, m) = \sum_{k=m}^{n} \binom{n}{k} p^k (1-p)^{n-k}. \quad \text{(Eq. 12)}$$

For example, if n=6, m=3, and p=0.7, then f(p,n,m) becomes 0.9295. Thus, precision may be improved by exploiting temporal information (or reducing false alarms). Further, a hard constraint may be imposed to prevent text boxes from significantly overlapping in frames of the video stream.

In a particular embodiment, multi-threading may be implemented to yield a better user experience such as a higher frame rate and to save computation power. Conventional text detection techniques and conventional text recognition techniques that use a single thread may be time consuming due to a low frame rate of the detection and recognition stage, may not produce real-time experience to the user, and may not produce a high frame rate. A disclosed embodiment utilizes multi-threaded processing including an OCR thread and a tracking thread. The OCR thread may process scene text and perform temporal filtering. Substantially concurrently with the OCR thread, the tracking thread may update results of the temporal filtering (e.g., by generating previews) at a high frame rate. It should be noted that the tracking stage has a higher frame rate (or lower latency) than the detection and recognition stage (i.e., the OCR thread). Thus, by using a multi-thread implementation including the OCR thread and the tracking thread, a higher frame rate is achieved compared to a system that utilizes a single thread.

During the temporal filtering process, coordinates of the text boxes obtained may not be that of a current frame (e.g., the coordinates may be the coordinate system of the text boxes in a previous frame) due to the multi-frame latency of the temporal filtering process. It is thus advantageous to transform the estimated text boxes in the t-th frame to the coordinate system of the current frame $I_{t+k}$(k≥1), as expressed in Eq. 10. The disclosed embodiments are described in further details with reference to FIGS. 1-7.

Referring to FIG. 1, a particular embodiment of a system to perform object tracking and processing is disclosed and generally designated 100. The system 100 includes an image capture device 102 coupled to an image processing device 104. The image processing device 104 is coupled to a display device 106 and to a memory 108. The image processing device 104 is configured to detect an object 151 (e.g., a text box 152) in incoming image data or video data and to track and to perform object processing of the object to generate updated state information of the object for display. Object processing may include object detection, object recognition, or a combination thereof.

In a particular embodiment, the image capture device 102 may include a lens 110 configured to direct incoming light representing an input image 150 of a scene with a text box 152 including text 153 to an image sensor 112. The image sensor 112 may be configured to generate video or image data 160 based on detected incoming light. The image capture device 102 may include a camera, a video recording device, a wireless device, a portable electronic device, or any combination thereof. It should be noted that the text box 152 is for illustrative purposes and may not appear in the scene. The text box 152 may be used to illustrate a corresponding object 151 in the input image 150. Although FIG. 1 illustrates one object 151, the input image 150 captured by the image capture device 102 may include multiple objects.

In a particular embodiment, the image processing device 104 may be configured to detect the object 151 (e.g., the text box 152 including the text 153) in the incoming video/image data 160 and track the object in each of a plurality of frames of the video data 160 to generate a tracking result and may also perform object processing (e.g., object detection and/or recognition) of a single frame of the plurality of frames. The image processing device 104 may further be configured to combine the tracking result with an output of the object processing to produce a combined output and to update state information of the object based on the combined output.

To illustrate, the tracker 114 may generate a tracking result for every frame of the plurality of frames of the video data 160 and update the state information 154 every frame (e.g., frame 1 result, frame 2 result, frame 3 result, frame 4 result, . . . , frame n result) due to the single-frame latency of the tracker 114. Thus, the state information 154 may be updated when a tracking result is available from the tracker 114 (i.e., at every frame). In contrast, an object detector/recognizer 124 may generate a frame result less frequently than the tracker 114 and may thus update the state information less frequently than the tracker 114, due to the multi-frame latency of the object detector/recognizer 124. For example, the object detector/recognizer 124 may not generate a frame result for some frames (i.e., "skip" some frames). Thus, the state information 154 may be updated based on the output of the object detector/recognizer 124 for a subset of frames (i.e., fewer than all of the frames). For example, while the tracker 114 may generate a frame result for every frame from frame 1 to frame n, the object detector/recognizer 124 may generate an output for only frames 1, 5, 13, . . . , and n, as shown in FIG. 1.

An output 170 of the updated state information 154 may be provided to the display device 106. The display device 106 may display an output image 170 based on the updated state information 154. For example, the state information 154 and subsequent updates (i.e., updated state information) may include information about the object 151, such as a location of the object from frame to frame, text contained in the object from frame to frame, augmented content related to the object, or any combination thereof.

To illustrate, the image processing device 104 may include an object tracker and recognizer 101. The object tracker and recognizer 101 may include a tracker 114, an object detector/recognizer 124, and a temporal filter 134. The tracker 114 may be configured to track the object 151 in each of a plurality of frames of the video data 160 to generate a tracking result. In a particular embodiment, the tracker 114 may have a single-frame latency. For example, the tracker 114 may track the object 151 in each of the plurality of frames of the video data 160 to generate a frame result for each of the plurality of frames (e.g., Frame 1 result, Frame 2 result, . . . Frame n result). The object detector/recognizer 124 may be configured to process the object 151 (e.g., detect the object 154, recognize the object 154, or any combination thereof) in a subset of frames of the plurality of frames. For example, the object detector/recognizer 124 may be an object detector and an object recognizer configured to detect and recognize the object 151 in the subset of frames of the plurality of frames.

In a particular embodiment, the object detector/recognizer 124 may have a multi-frame latency. For example, the object detector/recognizer 124 may not generate a frame result for one or more frames of the plurality of frames (i.e., the object detector/recognizer 124 generates a frame result less frequently than the tracker 114). The object detector/recognizer 124 may generate results for frames 1, 5, 13, . . . , and n, but may not generate frame results for frames 2, 3, 4, 6, 7, 8, 9, 10, 11, and 12, as shown in FIG. 1.

Thus, when updating the state information 154, object processing results (e.g., object detection results, object recognition results, or any combination thereof) may be unavailable for one or more frames (e.g., frames 2, 3, 4, 6, 7, 8, 9, 10, 11, and 12). For example, when updating the state information 154 based on frame 13 processing result (i.e., a current frame), the temporal filter 134 compensates for motion between frame 5 (a previous frame of the object detector/recognizer 124) and frame 13. In a particular embodiment, the temporal filter 134 may compensate for motions between a current frame and a previous frame based on historical motion information (i.e., motion history). To illustrate, the temporal filter 134 may utilize motion information between frame 1 result and frame 5 result (i.e., historical motion information) to determine motion information between the frame 5 result and the frame 13 result of the object detector/recognizer 124. Accordingly, when the object detector/recognizer 124 result is available, the temporal filter 134 may update the state information 154 based on the new object detector/recognizer 124 result, previous results of the object detector/recognizer 124, motion histories, or any combination thereof. In addition, when a tracker 114 result is available (i.e., for every frame of the plurality of frames), the temporal filter 134 may update the state information 154 based on the tracker 114 result. The object detector/recognizer 124 and the tracker 114 generate results at different frequencies, thus the temporal filter 134 may be asynchronously accessed by the object detector/recognizer 124 and the tracker 114.

The temporal filter 134 may receive tracking results (i.e., tracking results corresponding to each frame of the plurality of frames) more frequently from the tracker 114 than outputs from the object detector/recognizer 124 (i.e., outputs corresponding to a subset of the plurality of frames) and may be configured to combine a tracking result of the tracker 114 with an output of the object detector/recognizer 124 to produce a combined output 144 and to update the state information 154 of the object 151 based on the combined output 144. Thus, the state information 154 may include additional information compared with the combined output 144. The additional information may include motion history, reconstructed three-dimensional points, view points, etc. In a particular embodiment, the object 151 may correspond to a text box (e.g., the text box 152 including the text 153) and a location of the text box 152.

Figure 6:
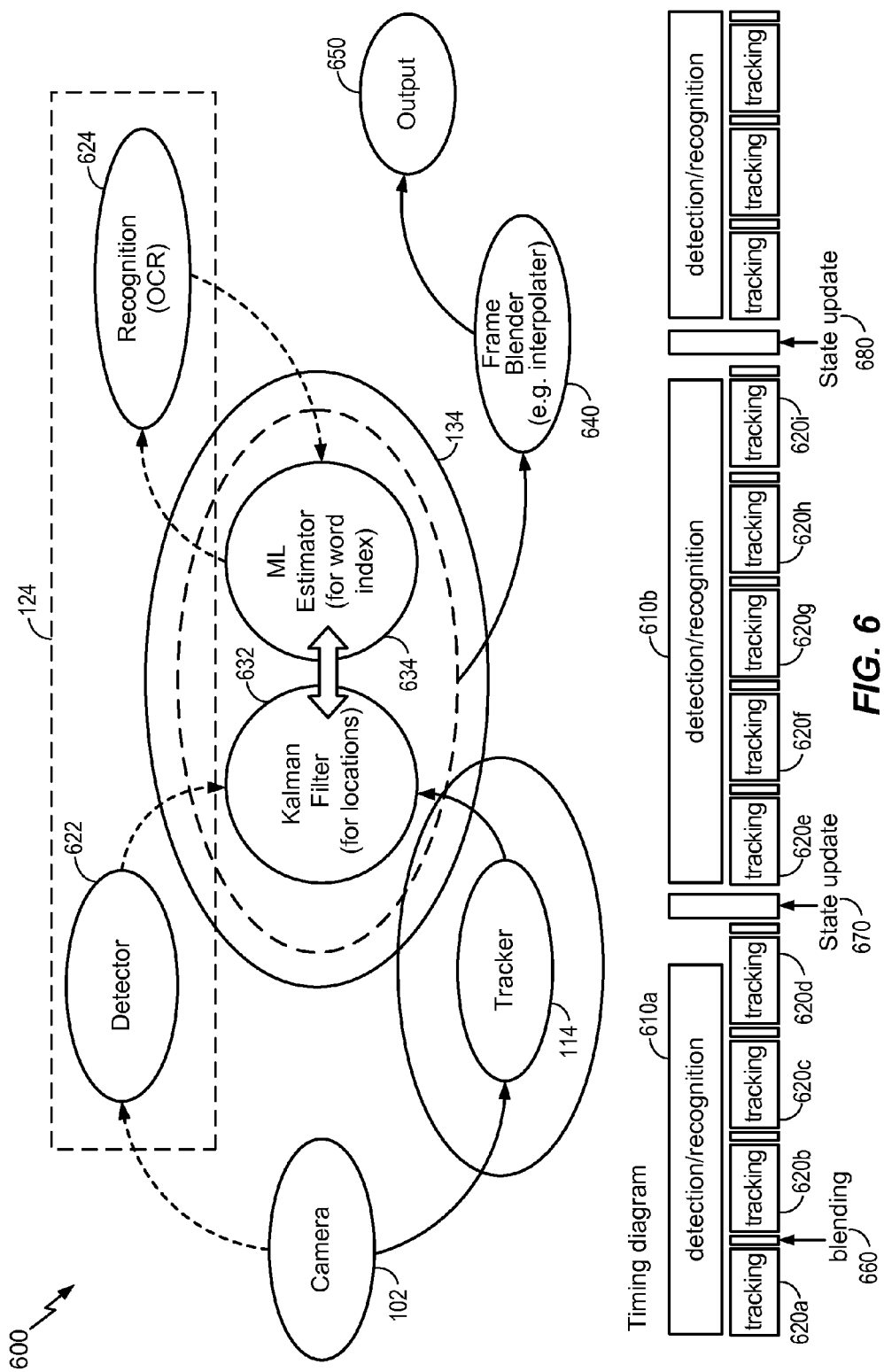
FIG. 6 is a general diagram to illustrate another example of object tracking and processing that may be performed by the system of FIG. 1.

In a particular embodiment, the temporal filter 134 may include a Kalman filter and a maximum-likelihood estimator as described with respect to FIG. 6. The Kalman filter may be configured to determine a location of the text box 152 including coordinates of the text box 152. For example, a location of the text box 152 may include a two-dimensional (2D) location of a bounding volume that encompasses the text 153 (e.g., x and y coordinates). A three-dimensional (3D) location of a bounding volume that encompasses the text 153 (e.g., x, y, and z coordinates) may be inferred or derived from the 2D location. In a particular embodiment, location processing may be performed using at least one of a Kalman filter, a Particle filter, or an Extended Kalman filter. In a particular embodiment, identification information may be obtained using at least one of a maximum-likelihood estimator or a maximum a posteriori estimator.

The maximum-likelihood estimator may be configured to generate proposed text data via optical character recognition (OCR) and to access a dictionary to verify the proposed text data. For example, the maximum-likelihood estimator may access one or more dictionaries stored in the memory 108, such as a representative dictionary 140. The proposed text data may include multiple text candidates 144 and confidence data associated with each of the multiple text candidates 144. The maximum-likelihood estimator may be configured to select a text candidate corresponding to an entry of the dictionary 140 according to a confidence value associated with the text candidate. To illustrate, the text 153 may be identified as 'car' with a confidence value of 95%, as 'cat' with a confidence value of 90%, and as 'carry' with a confidence value of 50%. Because text candidate 'car' has the highest confidence value, 'car' may be selected by the maximum-likelihood estimator.

In a particular embodiment, object processing (e.g., object detection, object recognition, or any combination thereof) by the object detector/recognizer 124 may be performed during an object processing stage of a processor into which the image processing device 104 is integrated. The object processing stage of the processor may include an object detection stage, an object recognition stage, or any combination thereof. Similarly, tracking by the tracker 114 may be performed during a tracking stage of the processor. The processor may further include a combining stage, where the tracking stage includes generation of the combined output of the temporal filter 134 and the updated state information 154. The tracking stage, the object processing stage (e.g., detection stage, recognition stage, or any combination thereof), and the combining stage are described in further detail with reference to FIG. 4.

In a particular embodiment, the display device 106 may be configured to use the updated state information 154 to generate the output image 170. For example, the display device 106 may include an image preview screen or other visual display device. The output image 170 displayed on the display device 106 may include identified text 157 and may also include image content 158 based on the object state. For example, the image content 158 may include augmented features inserted into the output image 170 based on the identified text 157. The augmented features may include related content embedded with the text 157. For example, if the text 157 is 'car,' the output image 170 may include the text 'car' and an image of a car, a definition of 'car,' types, makes, and/or models of cars, other information such as historical data, or any combination thereof. Thus, the output image 170 may include the text 157 retrieved from real world scenes and may also include related content based on the text 157. By generating the output image 170 in this manner, the image processing device 104 may provide useful and interesting information to a user.

In a particular embodiment, at least a portion of the image processing device 104 (e.g., including the tracker 114, the object detector/recognizer 124, the temporal filter 134, or any combination thereof) may be implemented via dedicated circuitry. In other embodiments, at least a portion of the image processing device 104 may be implemented by a hardware processor (or multiple processors) that executes computer executable code in the image processing device 104. To illustrate, the memory 108 may include a non-transitory computer-readable medium storing program instructions 142 that are executable by a processor or multiple processors in or coupled to the image processing device 104. The program instructions 142 may include code for tracking an object in each of a plurality of frames of video data, such as the video data 160 and code for generating a tracking result. The program instructions 142 may include code for performing object processing (e.g., object detection, object recognition, or any combination thereof) of the object in a subset of frames of the plurality of frames, where the subset of frames are selected according to a multi-frame latency of the detector/recognizer 124. The program instructions 142 may also include code for combining the tracking result with an output of the object processing (e.g., object detection, objection recognition, or any combination thereof) to produce a combined output and code for updating state information of the object based on the combined output, in response to completion of the object processing of the single frame.

A system that utilizes only an object detector/recognizer in an image capture device may experience flickering in a displayed output due to the multi-frame latency of the object detector/recognizer. For example, an object in a first location (e.g., x1, y1) in a first frame may have moved to a fourth location (e.g., x4, y4) in a fourth frame by the time the object detector/recognizer completes detection and recognition of the first frame, causing a jump or flickering (e.g., due to the lost frames) of an output image. Further, a system that uses only a tracker may not accurately identify objects captured by the image capture device. The system of FIG. 1 may thus provide a user with more accurate information and identification of objects captured by the image capture device of FIG. 1 by utilizing the object detector/recognizer in conjunction with an object tracker to reduce or eliminate flickering and to reduce latency as compared to an image processing device that utilizes only an object detector/recognizer (e.g., a detection and recognition engine) or only a tracker.

Figure 2:
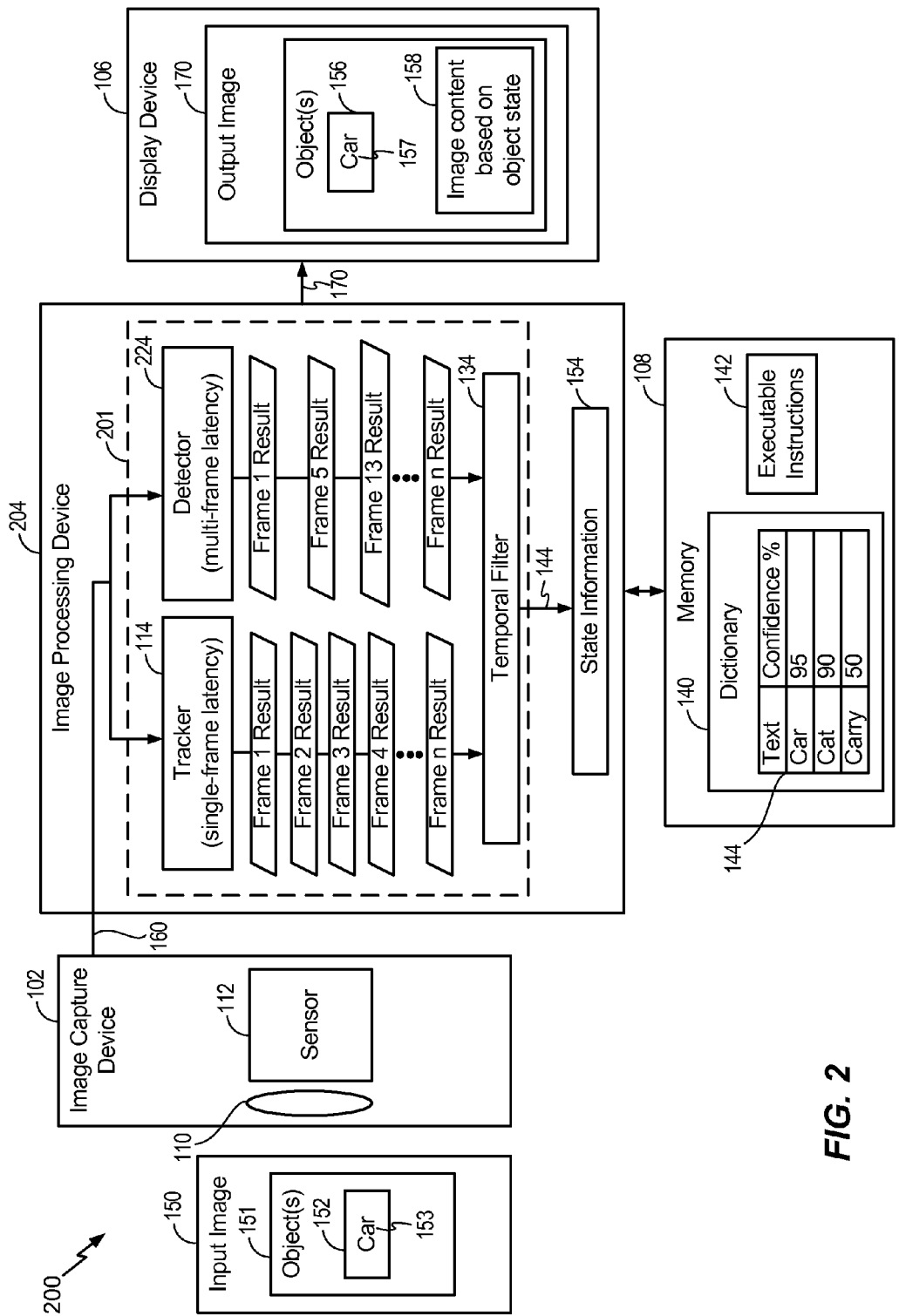
FIG. 2 is a block diagram of a particular embodiment of a system to perform object tracking and detection.

Referring to FIG. 2, a particular embodiment of a system to perform object tracking and detection is disclosed and generally designated 200. The system 200 includes the image capture device 102, the display device 106, and the memory 108 of FIG. 1 coupled to an image processing device 204. The image capture device 102, the display device 106, and the memory 108 may be configured to operate as described with respect to FIG. 1. The image processing device 204 may be configured to detect the object 151 of the input image 150 in incoming image data or video data and to track and perform object detection of the object 151 to generate updated state information 154 of the object 151 for display.

The image processing device 204 includes an object tracker and detector 201. The object tracker and detector 201 includes the tracker 114, an object detector 224, and the temporal filter 134. The tracker 114 may be configured to track the object 151 in each of a plurality of frames of the video data 160 to generate a tracking result. In a particular embodiment, the tracker 114 has a single-frame latency. For example, the tracker 114 may track the object 151 in each of the plurality of frames of the video data 160 to generate a frame result for each of the plurality of frames (e.g., Frame 1 result, Frame 2 result, . . . Frame n result). The object detector 224 may be configured to detect the object 151 in the subset of frames of the plurality of frames. In a particular embodiment, the object detector 224 is not configured to perform object recognition.

Because the image processing device 204 may perform object tracking and object detection without performing object recognition, the image processing device may consume less computing power than the image processing device 104 of FIG. 1 that performs object tracking, object detection, and object recognition.

Figure 3:
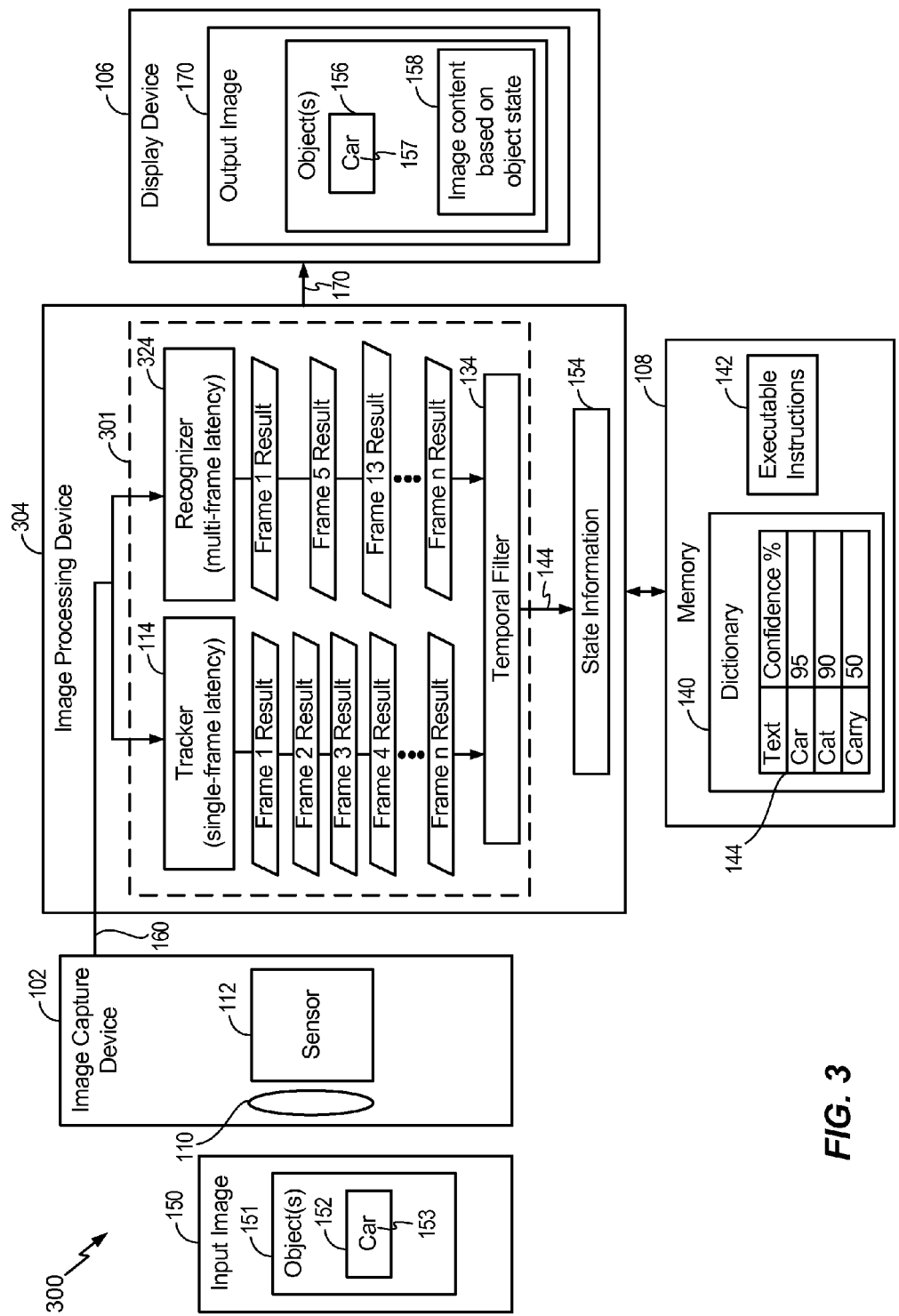
FIG. 3 is a block diagram of another particular embodiment of a system to perform object tracking and recognition.

Referring to FIG. 3, another particular embodiment of a system to perform object tracking and recognition is disclosed and generally designated 300. The system 300 includes the image capture device 102, the display device 106, and the memory 108 of FIG. 1 coupled to an image processing device 304. The image capture device 102, the display device 106, and the memory 108 may be configured to operate as described with respect to FIG. 1. The image processing device 304 may be configured to recognize the object 151 of the input image 150 in incoming image data or video data and to track and perform object recognition of the object 151 to generate updated state information 154 of the object 151 for display.

The image processing device 304 includes an object tracker and recognizer 301. The object tracker and recognizer 301 includes the tracker 114, an object recognizer 324, and the temporal filter 134. The tracker 114 may be configured to track the object 151 in each of a plurality of frames of the video data 160 to generate a tracking result. In a particular embodiment, the tracker 114 has a single-frame latency. For example, the tracker 114 may track the object 151 in each of the plurality of frames of the video data 160 to generate a frame result for each of the plurality of frames (e.g., Frame 1 result, Frame 2 result, . . . Frame n result). The object recognizer 324 may be configured to recognize the object 151 in the subset of frames of the plurality of frames. In a particular embodiment, the object recognizer 324 is not configured to perform object detection.

Because image processing device 304 may perform object tracking and object recognition without performing objection detection, the image processing device 304 may consume less computing power than the image processing device 104 of FIG. 1 that performs object tracking, object detection, and object recognition.

Figure 4:
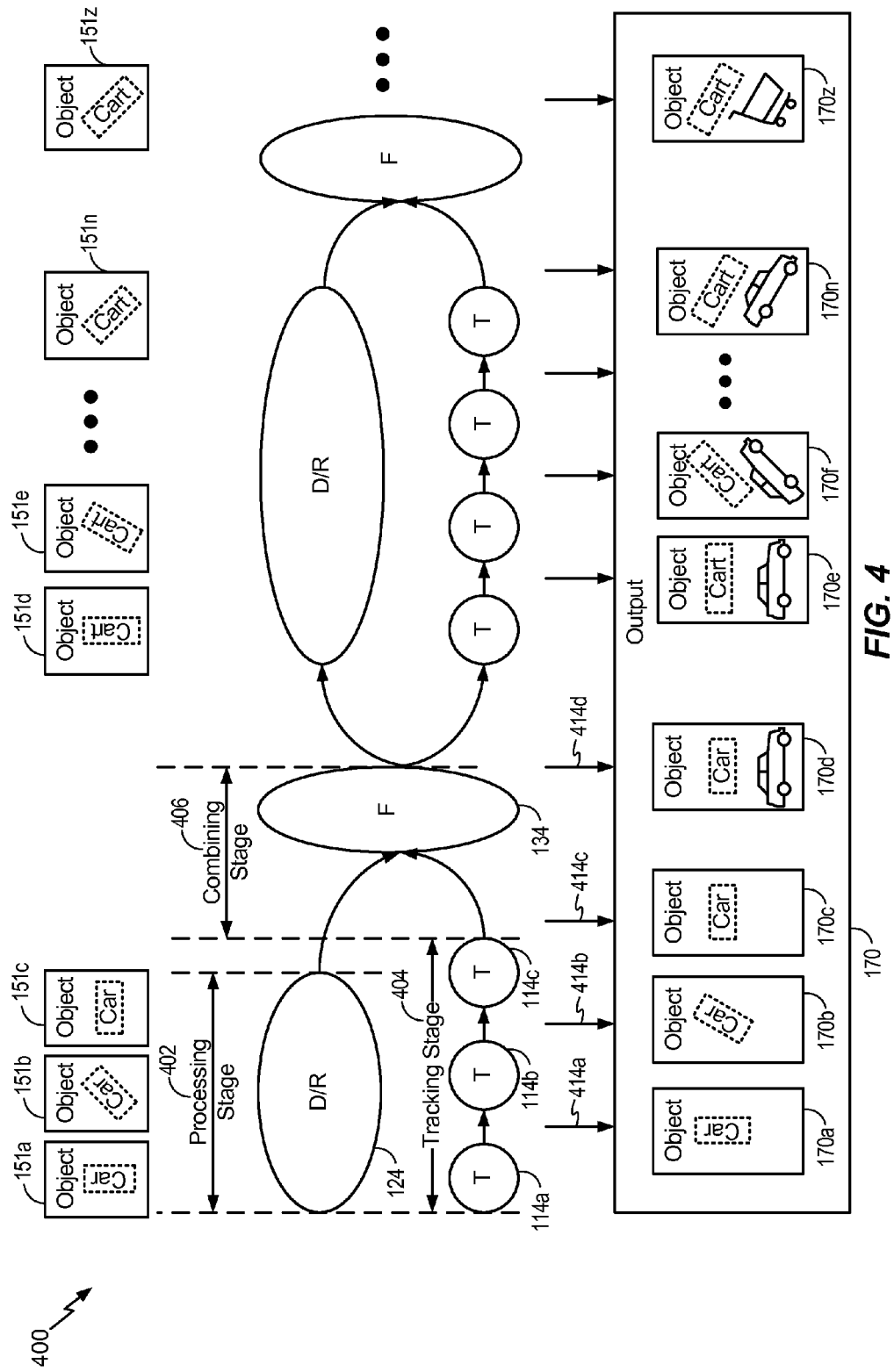
FIG. 4 is a general diagram to illustrate an example of object tracking and processing that may be performed by the system of FIG. 1.

Referring to FIG. 4, a general diagram illustrating an example of object tracking and processing that may be performed by the systems 100-300 of FIGS. 1-3 is disclosed and generally designated 400. FIG. 4 depicts various image processing stages of an image processing device. The stages may include an object processing stage 402 (e.g., a detection stage, a recognition stage, or any combination thereof), a tracking stage 404, and a combining stage 406.

In a particular embodiment, object processing (e.g., objection detection, object recognition, or any combination thereof) by the object processor (e.g., the object detector/recognizer 124 of FIG. 1, the object detector 224 of FIG. 2, or the object recognizer 324 of FIG. 3) may be performed during the object processing stage 402, object tracking by the tracker 114 may be performed during the tracking stage 404, and a combination of a result of the tracking stage 404 with an output of the object processing stage 402 may be performed during the combining stage 406. The combining stage 406 may also include updating state information of the object and may be performed by the temporal filter 134.

In a particular embodiment, a result of the tracking stage 404 may be generated more frequently than an output of the object processing stage 402 because the tracker 114 may have a single-frame latency while the object processor (e.g. the detector/recognizer 124) may have a multi-frame latency. The combining stage 406 may produce a combined output by the temporal filter 134 and update the state information 154. It should be noted that the tracking stage 404 and the object processing stage 402 may at least partially overlap in time (e.g., concurrently or simultaneously). For example, the tracking stage 404 or portions of the tracking stage 404 may be performed concurrently with the object processing stage 402 or a portion of the object processing stage 402.

During operation, the image processing device 104 may receive the video data 160 captured by the image capture device 102 as a plurality of frames of the video data 160. The image processing device 104 may provide the plurality of video frames of the video data 160 to the object tracker and recognizer 101. The object tracker and recognizer 101 may include the tracker 114, the object detector/recognizer 124, and the temporal filter 134 of FIG. 1. To illustrate, the tracking stage 404 and the object processing stage 402 may be initiated upon receipt of a first frame 151a of the plurality of frames, where the plurality of frames 151a-151c include the text 153 (i.e., "car") captured by the image capture device 104.

During the tracking stage 404, the tracker 114 may track the text 153 in each of the plurality of video frames 151a-151c to generate a tracking result 414a-414c, respectively, for each of the plurality of video frames 151a-151c. The text 153 may be tracked based on motion of the text 153 or the text box 152 in a scene relative to the image capture device 102 (e.g., text on a moving vehicle) or based on motion of the image capture device 102 relative to the text 153 or relative to the text box 152. The tracking stage 404 may generate a first tracking result 414a corresponding to the first frame 151a, a second tracking result 414b corresponding to a second frame 151b, and a third tracking result 414c corresponding to a third frame 151c. Each of the first tracking result 414a, the second tracking result 414b, and the third tracking result 414c may be provided as a first tracking output 170a, a second tracking output 170b, and a third tracking output 170c, as shown.

In a particular embodiment, the tracker 114 may have a single-frame latency. Thus, the tracker 114 may be configured to track motion (e.g., location) of the text 153 in each of the plurality of frames 151a-151c of the video data 160 to generate a frame result (e.g., tracking result) 414a-414c for each of the plurality of video frames 151a-151c. For example, the tracker 114 may track the text 151 as it is located vertically in the first video frame 151a, diagonally in the second video frame 151b, and horizontally in the third video frame 151c. To illustrate, the tracker 114 may perform first tracking 114a of the first video frame 151a to generate the first tracking result 414a, second tracking 114b of the second video frame 151b to generate the second tracking result 414b, and third tracking 114c of the third video frame 151c to generate the third tracking result 414c.

Although FIG. 4 illustrates tracking performed on three video frames during the tracking stage 404, it should be noted that the tracking stage 404 may include tracking fewer than three or more than three video frames during a particular occurrence of the tracking stage 404. Further, it should be noted that multiple objects (e.g., multiple text boxes) in the video data 160 may be tracked in each video frame of the plurality of video frames.

During the object processing stage 402, the object detector/recognizer 124 may begin detecting (e.g., identifying) the text 153 in the first video frame 151a. For example, the detector/recognizer 124 may be configured to detect and recognize the text 153 in the first video frame 151a during the object processing stage 402. In a particular embodiment, the detector/recognizer 124 may have a multi-frame latency. Thus, the object processing stage 402 may span in time over multiple frames of the plurality of frames. For example, the object processing stage 402 may generate a frame result (i.e., detection and recognition of the text 153) less frequently than the tracking stage 404. During the object processing stage 402, the detector/recognizer 124 may be configured to receive the first frame 151a containing the text 153, to detect the text 153 in the first frame 151a, and to generate proposed text data via optical character recognition (OCR). Thus, the object processing stage 402 may include detecting a region surrounding the text 153 in the first frame 151a, recognizing (i.e., identifying) the text 153 in the first frame 151a, or any combination thereof. The object detector/recognizes 124 may further be configured to access a dictionary to verify the proposed text data. For example, the object detector/recognizer 124 may access one or more dictionaries stored in the memory 108 of FIG. 1, such as the dictionary 140. The proposed text data may include a plurality of text candidates and confidence data associated with the plurality of text candidates. The detector/recognizer 124 may select a text candidate corresponding to an entry (e.g., the entry 144) of the dictionary 140 according to a confidence value associated with the text candidate. At the termination (e.g., completion) of the object processing stage 402 (e.g., the detection stage, the recognition stage, or any combination thereof), an output of the object detector/recognizer 124 may be generated. The output from the object processing stage 402 may be provided to the temporal filter 134.

The combining stage 406 may be triggered when a result is available by either the tracking stage 404 or the object processing stage 402. Because the object processing stage 402 spans a plurality of video frames, the combining stage 406 may be triggered more frequently by a result from the tracking stage 404 than by an output of the object processing stage 402. For example, the tracking stage 404 and the object processing stage 402 may both begin upon receipt of the first frame 151a; however, the tracking stage 404 may continue to track the text 153 in the second video frame 151b and in the third video frame 151c (i.e., tracking in multiple frames) while the object processing stage 402 detects/recognizes the text 153 in the first frame 151a (i.e., detection/recognition in a single frame).

During the combining stage 406, the temporal filter 134 may be configured to combine the tracking result of the tracker 114 (e.g., the first tracking result 414a, the second tracking result 414b, and the third tracking result 414c) generated by the tracking stage 404 with the output of the object detector/recognizer 124 generated in the object processing stage 402. The temporal filter 134 may further be configured to obtain temporal information of the text 153 (i.e., to obtain a combined output based on the tracking stage 404 and the object processing stage 402). In a particular embodiment, combining the tracking results with the output of the object processing (e.g., detection, recognition, or any combination thereof) includes integrating the tracking result with respect to the output of the object processing to obtain the temporal information of the text 153. Temporal information computed based on a sequence of frames may reduce or eliminate false detection of the text 153 compared to when information from a single frame (e.g., information from only the object detection and recognition) is used. Thus, the temporal filter 134 of the combining stage 406 may be configured to integrate the output of the object detector/recognizer 124 of consecutive frames by using motion information (i.e., tracking results) between the consecutive frames.

In a particular embodiment, integrating the tracking results with the output of the object detection and recognition may include using a Kalman filter in conjunction with a maximum-likelihood estimator. For example, the temporal filter 134 may include a Kalman filter and a maximum-likelihood estimator for performing the integration. The Kalman filter may be configured to determine a location of the text 153 in each of the plurality of frames as the text moves relative to the image capture device 102 over a period of time, or as the image capture device 102 moves relative to the text 153 in each of the plurality of frames over a period of time. The maximum-likelihood estimator may be configured to generate proposed text data (e.g., via optical character recognition (OCR)) representing the text 153 in each of the plurality of frames.

Upon completion of the combining stage 406, a combined output 414d may be generated, and the state information 154 of the text 153 may be updated based on the combined output 414d. Further, an output 170d based at least in part on the updated state information 154 may be provided to the display device 106 of FIG. 1. In a particular embodiment, the output 170d of the combining stage 406 may include the identified text 153 and may also include one or more augmented reality features inserted into the output 170d based on the identified text 153. The augmented reality features may include related content embedded with the text 153. For example, the text 153 identified as "car" may also include an image of a car, as shown in the output 170d. To illustrate, the updated state information 154 may include a movement of the text 153 between successive frames (e.g., frames 151a-151c), and the output 170d of the combining stage 406 may be modified based on the movement, as shown in FIG. 4. The temporal filter 134 may select the one or more augmented reality features based on meaning, translation, or other aspects of the text 153. In a particular embodiment, the at least one augmented reality feature appears as a three-dimensional object in the output 170.

Upon completion of the combining stage 406, the object processing stage 402 may be initiated again on a next frame of the plurality of frames (e.g., the fourth video frame 151d). In addition, tracking may be performed on the fourth video frame 151d and successive video frames (e.g., fifth video frame 151e . . . nth video frame 151n). Although FIG. 4 illustrates a gap between the third video frame 151c and the fourth video frame 151d for clarity of explanation, the frames 151a-151z may be received and processed at substantially regular intervals. In the fourth video frame 151d, the text 153, previously identified as "car," may be re-identified as "cart." For example, the letter 't' may have been included during detection and/or recognition of a prior frame (e.g., the first frame 151a), and the text 153 may be re-identified as "cart." The tracking stage 404 may continue to provide results of the tracking (e.g., fifth tracking result 170e, sixth tracking result 170f . . . nth tracking result 170n) while the detection and recognition of the text 153 (i.e., "cart") is being performed on the fourth video frame 151d, as described above. The combining stage may be triggered by termination of the tracking stage 404. Thus, the result of the tracking stage 404 and the output from the object processing stage 402 may be provided to the temporal filter 134 during the combining stage 406, as previously described, to generate a combined output 170z. The combined output 170z may include the corrected/new text 153 ("cart") including content related to the text 153 (i.e., augmented features).

Thus, the described embodiments may provide accurate identification of text in video data by use of temporal information (i.e., text in the same region/text box is likely the same in multiple frames) of the text, where an output of object detection in a single frame is combined with a result of object tracking across multiple frames. The combination of a tracker and a detector/recognizer as described may also result in an improved user experience by providing the user of an image capture device with accurate text identification at a relatively high frame rate and substantially free of flickering. Although object processing stage 402 is described with respect to the object detector/recognizer 124 of FIG. 1, in other embodiments the object processing stage 402 can include object detection performed by the object detector 224 of FIG. 2 or object recognition performed by the object recognizer 324 of FIG. 3.

Figure 5:
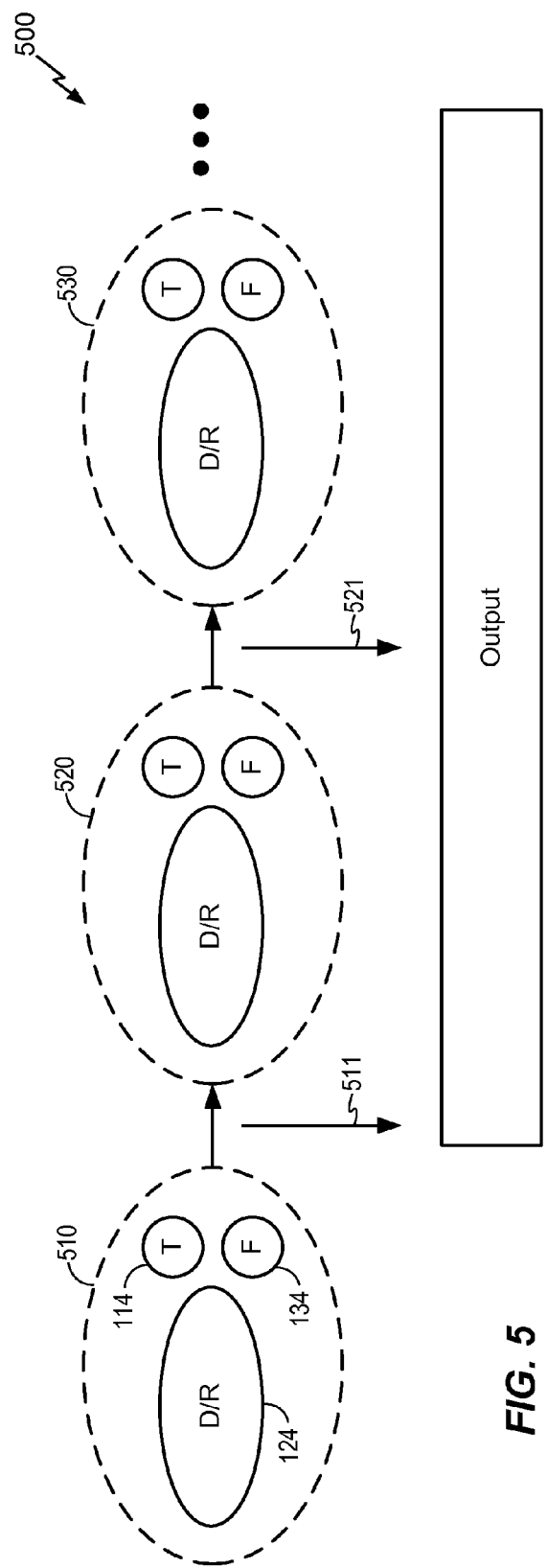
FIG. 5 is a general diagram to illustrate another example of object tracking and processing that may be performed by the system of FIG. 1.

Referring to FIG. 5, a general diagram 500 illustrates another example of object processing (e.g., object tracking, object recognition, or any combination thereof) that may be performed by the systems 100-300 of FIGS. 1-3 where the tracker 114 and object detector/recognizer 124 of FIG. 1, the object detector 224 of FIG. 2, and/or the object recognizer 324 of FIG. 3, each have a single-frame latency. FIG. 5 depicts a plurality of video frames 510, 520, and 530 and processing of the plurality of video frames 510-530 by the system 100 of FIG. 1 to generate an output for each video frame.

During operation, a first video frame 510 may be provided to the image processing device 104 of FIG. 1. The image processing device 104 may include the tracker 114, the object detector/recognizer 124, and the temporal filter 134. For each frame 510-530, the object detector/recognizer 124 may perform processing (e.g., detection and/or recognition) of text to generate a detection/recognition output, the tracker 114 may perform tracking of the text to generate a tracking result, and the temporal filter 134 may combine the output of the detection and/or recognition with the tracking result to produce a combined output.

To illustrate, the object detector/recognizer 124 may perform object processing (e.g., object detection and/or object recognition) on the first frame 510 to detect a text object (or a region in the first frame 510 that includes text) in the first frame 510 and to generate a first output (e.g., recognized text data) of the object detector/recognizer 124, and the tracker 114 may track the text object in the first frame 510 to generate a first tracking result. The temporal filter 134 may combine the first output of the detector/recognizer 124 with the first tracking result to generate a first combined output 511 (e.g., a text output). In a particular embodiment, the text output may include the recognized text data (e.g., "car") and location information for the text data (e.g., two-dimensional or three-dimensional coordinates of the text data). Similarly, the object detector/recognizer 124 may perform text object processing (e.g., text object detection and/or text object recognition) on the second frame 520 to generate a second output of the detector/recognizer 124 and the tracker 114 may track the text object in the second frame 520 to generate a second tracking result. The temporal filter 134 may combine the second output of the object detector/recognizer 124 with the second tracking result to generate a second combined output 521. The process may be repeated for each frame in the plurality of frames to generate a plurality of combined outputs. Thus, the embodiment described in FIG. 5 may combine a text processing (e.g., detection and/or recognition) output with a text tracking result for each of a plurality of frames of video data to provide identification of a text object in the video data.

Referring to FIG. 6, a general diagram illustrating an example of operation of the systems 100-300 of FIGS. 1-3 is disclosed and generally designated 600. In particular, FIG. 6 illustrates a control flow and a timing diagram of the system 100 of FIG. 1.

A camera 102 (i.e., the image capture device 102 of FIG. 1) may provide video data 160 to a tracker 114 and to a detector 622 of the detector/recognizer 124. The video data 160 may include a plurality of video frames that include the object 151 (e.g., including the text 153). The detector 622 may be configured to detect the text 153 in each of the plurality of video frames and to provide an output of the detection to a Kalman filter 632 of the temporal filter 134. In addition, the tracker 114 may be configured to track the text 153 (e.g., by tracking the text box 152) in each of the plurality of video frames (i.e., detect motion between the text 153 in successive video frames) and to provide an output of the tracking to the Kalman filter 632.

The Kalman filter 632 may be configured to access information from a maximum-likelihood estimator 634 of the temporal filter 134 and to provide an output of the Kalman filter 632 to the maximum-likelihood estimator 634. In a particular embodiment, the Kalman filter 632 may be configured to determine a location of the text 153 including coordinates of the text 153. For example, a location of the text 153 may include a two-dimensional (2D) location of the text box 152. A three-dimensional (3D) location of a bounding volume that encompasses the text 153 (e.g., x, y, and z coordinates) may be inferred from the 2D location. In addition, the Kalman filter 632 may be configured to update the location (i.e., position) of the text 153 over time based on processing of successive video frames.

The maximum-likelihood estimator 634 may be configured to generate proposed text data based on detected text and motion of the text in the plurality of video frames. The maximum-likelihood estimator 634 may be configured to access a dictionary to verify the proposed text data. For example, the maximum-likelihood estimator may access one or more dictionaries stored in a memory (e.g., dictionary 140 of FIG. 1). The proposed text data may include multiple text candidates and confidence data associated with the multiple text candidates. The maximum-likelihood estimator 634 may be configured to select a text candidate corresponding to an entry of the dictionary 140 according to a confidence value associated with the text candidate. For example, the maximum-likelihood estimator 634 may select text because the text has the highest corresponding confidence value in the dictionary 140.

A recognition device 624 of the detector/recognizer 124 may be configured to recognize (i.e., identify) text in each of the plurality of frames. The recognition device 624 may include optical character recognition (OCR). The recognition device 624 may be configured to translate text pixel data into machine-encoded text. By translating the text in each of the plurality of video frames into machine-encoded text, the text from each frame may be stored, displayed, and provided to the maximum-likelihood estimator 634 to improve accuracy of identified text. It should be noted that although the detector 622 and the recognition device 624 are shown as two separate components of the detector/recognizer 124, the detector 622 and the recognition device 624 may be incorporated into one component.

An output of the temporal filter 134 (including the Kalman filter 632 and the maximum-likelihood estimator 634) may be provided to a frame blender 640 prior to generating a display output 650. The frame blender 640 may include an interpolater and may be configured to generate intermediate frames between existing frames (i.e., the plurality of frames of the video data 160 generated by the camera 102) to enable a more fluid display of the frames on a display device (e.g., the display device 106 of FIG. 1). For example, if a frame rate of the video data 160 captured by the camera 102 is less than a frame rate of the display device 106, the frame blender 640 may be configured to duplicate one or more of the plurality of video and/or generate intermediate frames prior to displaying the video frames at the display device 106 to produce a fluid output 650 (i.e., display)

FIG. 6 also depicts a timing diagram of object tracking and recognition that may be performed by the system 100 of FIG. 1. In the timing diagram, detection/recognition 610a for a first frame of the plurality of frames may at least partially overlap in time (e.g., concurrently or simultaneously) with tracking 620a of the first frame of the plurality of frames. In a particular embodiment, tracking may be performed for one or more frames of the plurality of frames while detection/recognition is being performed for the first frame. For example, while detection recognition 610a is being performed by the detector/recognizer 124, tracking may be performed on the first frame 620a, a second frame 620b, a third frame 620c, and a third frame 620d, as shown. Thus, the tracker 114 may have a single-frame latency and the detector/recognizer 124 may have a multi-frame latency.

In addition, blending 660, by the frame blender 640, may be performed between each of the plurality of frames (e.g., between each tracking 620a-620d) to provide intermediate frame data at the display device 106. Upon completion of the tracking 620d of the fourth frame, a state update 670 may be performed by the temporal filter 134. The temporal filter may be configured to update the state information based on tracking 620a-620d of each of the plurality of frames and the detection/recognition 610a of a single frame. For example, the state information and subsequent updates may include a location of the text 153 from frame to frame, identification of the text 153 (e.g., "car"), and augmented content related to the text 153 (e.g., 3D images). After updating of the state information is performed, the detector/recognizer 124 may begin detection/recognition 610b of a next available frame. For example, the next frame may be a fifth frame. Similarly, the tracker 114 may begin tracking 620e the fifth frame, tracking 620f a sixth frame, tracking 620g a seventh frame, tracking 620h an eight frame, and tracking 620i a ninth frame. The frame blender 640 may generate and insert intermediate frames between the frames (i.e., blending 660). Tracking result(s) from the tracking (620e-620i) may be combined with an output of the detection/recognition 610b to generate a combined output and to update 680 the state information. Detection/recognition and tracking may continue to be performed until all frames of the plurality of frames have been processed.

Figure 7:
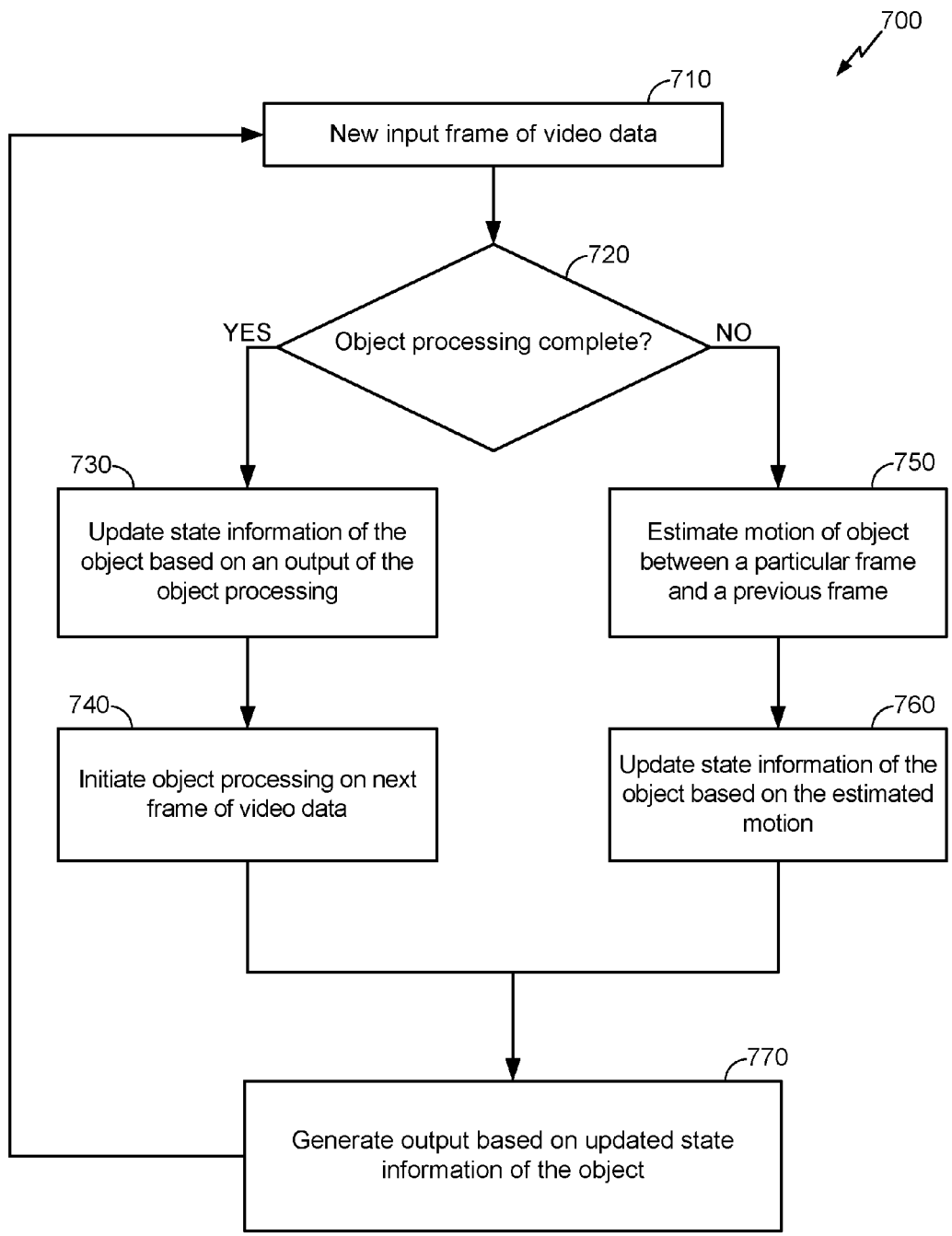
FIG. 7 is a flow diagram of a method of performing object tracking and processing.

Referring to FIG. 7, a flow diagram of a method 700 of performing object tracking and processing is illustrated. In an illustrative embodiment, the method 700 may be performed at the image processing device 104 of FIG. 1, at the image processing device 204 of FIG. 2, or at the image processing device 304 of FIG. 3.

The method 700 may include receiving an input frame of video data, at 710. For example, the image processing device 104 may receive video data 160 from the image capture device 102. The video data 160 may include a plurality of video frames. Each of the plurality of video frames of the video data 160 may include the object 151 that contains text 153. The image processing device 104 may include an object tracker and recognizer 101. The object tracker and recognizer 101 may include the tracker 114, the detector/recognizer 124, and the temporal filter 134.

The method 700 may also include determining whether object processing is complete, at decision element 720. For example, the object tracker and recognizer 101 of FIG. 1 may be configured to determine whether object detection and/or object recognition of a single frame (e.g., a first frame of the plurality of frames of the video data 160) has been completed by the detector/recognizer 124. As another example, the object tracker and detector 201 of FIG. 2 may be configured to determine whether object detection of a single frame has been completed by the object detector 224. As another example, the object tracker and recognizer 301 of FIG. 3 may be configured to determine whether object recognition of a single frame has been completed by the object recognizer 324. In a particular embodiment, the object processing may have a multi-frame latency.

In response to determining that the object processing has completed, at 720, state information of the object may be updated based on an output of the object processing, at 730, and object processing may be initiated on a next frame of video data, at 740. For example, if the detector/recognizer 124 of FIG. 1 has completed object detection and/or object recognition of a current frame of the plurality of frames, a current output of the detector/recognizer 124 may be used to update state information of the object. To illustrate, the object detector/recognizer 124 may re-identify (i.e., detect and recognize) the object 151 as text "cart" in the current frame (e.g., the letter 't' was occluded in a previous frame and the text was identified as "car") and may update the state information of the object, for example, by replacing a previously identified text "car" with a currently identified text "cart." Further, the detector/recognizer 124 may initiate object detection and/or object recognition on the next frame of video data (e.g., a second frame).

Prior to detecting that object processing (e.g., object detection and/or object recognition) has completed, at 720, a motion of an object between a particular frame and a previous frame may be estimated, at 750, and state information of the object may be updated based on the estimated motion, at 760. For example, if the detector/recognizer 124 of FIG. 1 has not completed object processing (e.g., object detection and/or object recognition) of the first frame, the tracker 114 may perform motion estimation of the text 153 between the second frame and the first frame. To illustrate, the text 153 may have moved to a diagonal position in the second frame from a vertical position in the first frame. The tracker 114 may be configured to track the motion of the text 153 in the first frame and the second frame and to estimate the motion of the text 153 from frame to frame. Further, a tracking result of the motion estimation by the tracker 114 may be used to update the state information of the text 153 before the processing is complete (i.e., due to the multi-frame latency of the detector/recognizer 124). For example, the updated state information may include a location change of the text 153 from frame to frame. To illustrate, the updated state information may include a first location (e.g., coordinate x1, y1) of the text 153 in the first frame updated by a second location (e.g., coordinate x2, y2) of the text 153 in the second frame.

An output may be generated based on the updated state information of the object, at 770. For example, the state information and subsequent updates provided by the tracker 114 and the detector/recognizer 124 of FIG. 1 may include information about the object such as location of the object from frame to frame, text contained in the object from frame to frame, augmented content related to the object, or any combination thereof. Thus, the image processing device 104 may generate an output (e.g., the text and embedded content) based on the updated state information for display at the display device 106.

Figure 8:
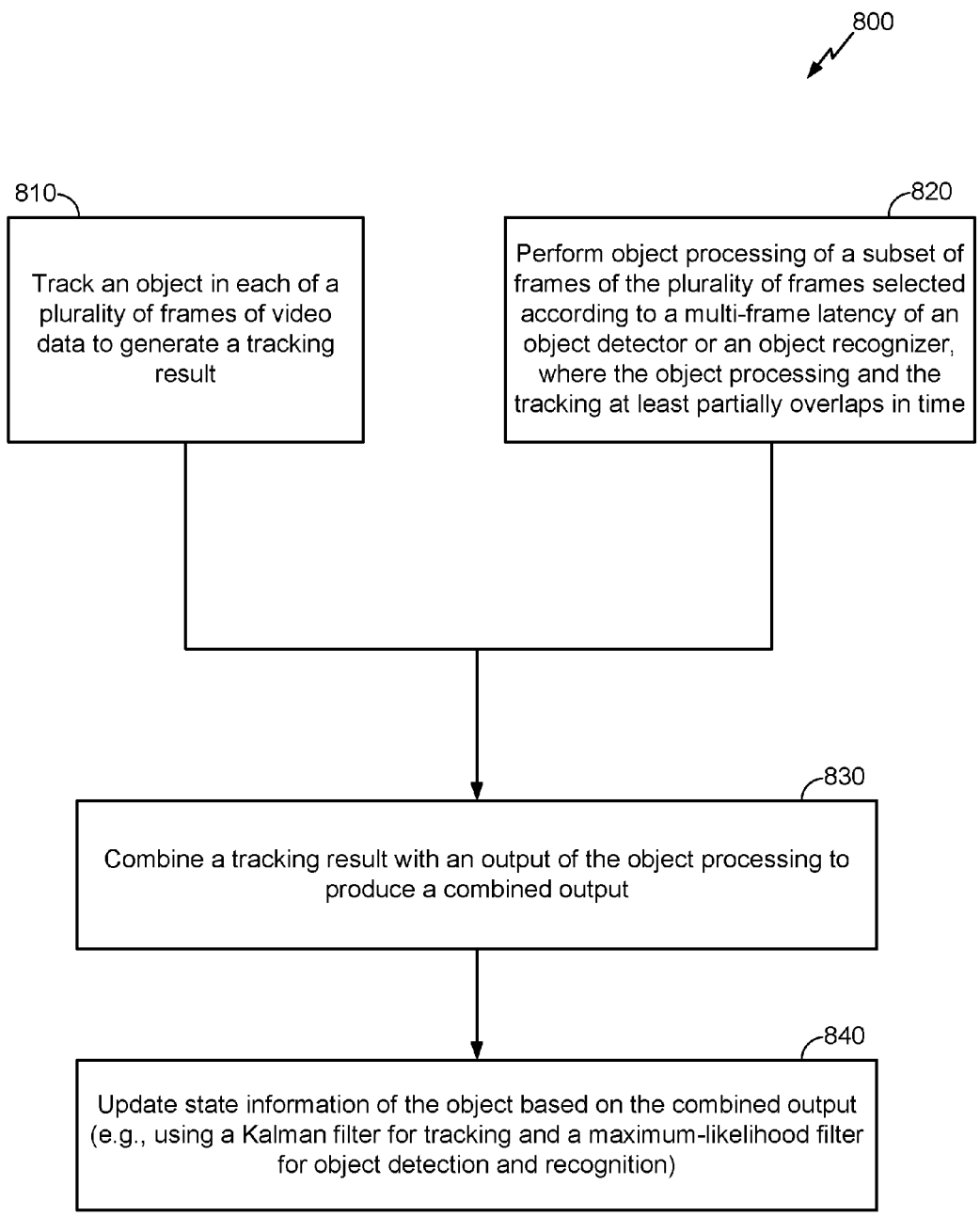
FIG. 8 is a flow diagram of a another method of performing object tracking and processing.

Referring to FIG. 8, a flow diagram of another particular embodiment of a method 800 of performing object tracking and recognition is illustrated. In an illustrative embodiment, the method 800 may be performed at the image processing device 104 of FIG. 1, the image processing device 204 of FIG. 2, or the image processing device 304 of FIG. 3.

The method 800 includes tracking an object in each of a plurality of frames of video data to generate a tracking result, at 810. For example, the tracker 114 of FIGS. 1-3 may be configured to track an object (e.g., the object 151 including text 153) in each of a plurality of frames of the video data 160 (e.g., a first frame, a second frame, a third frame, etc) and to generate a frame result for each of the plurality of frames (e.g., frame 1 result, frame 2 result . . . frame N result).

The method 800 also includes performing object processing (e.g., object detection, object recognition, or any combination thereof) of a subset of frames of the plurality of frames selected according to a multi-frame latency of an object detector or an object recognizer, where the object processing and the tracking at least partially overlaps in time, at 820. For example, the detector/recognizer 124 of FIG. 1 may be configured to detect and/or recognize the object 151 in a subset of frames of the plurality of frames (e.g., in the first frame, fifth frame, and thirteenth frame) and to generate a single frame result (e.g., frame 5 result) for every N frame results generated by the tracker 114 (e.g., frames 2-4), where N is an integer greater than 1.

The tracking result is combined with an output of the object processing to produce a combined output, at 830. For example, the temporal filter 134 may configured to combine a tracking result of the tracker 114 (i.e., frame 1 result, frame 2 result, and frame 3 result of the tracker 114) with the output of the object processing (e.g., frame 1 result of the detector/recognizer 124) to produce the combined output (e.g., combined output 144).

State information of the object is updated based on the combined output, at 840. For example, the temporal filter 134 may include the Kalman filter 632 of FIG. 6 and the maximum-likelihood estimator 634 of FIG. 6. Further, the temporal filter 134 may be configured to update the state information 154 of the object based on the combined output 144. For example, the updated state information 154 may include an array including information corresponding to the object from frame to frame (i.e., over a period of time). To illustrate, the updated state information 154 may include a location of the object, text identified from the object, content related to the text, or any combination thereof.

Figure 9:
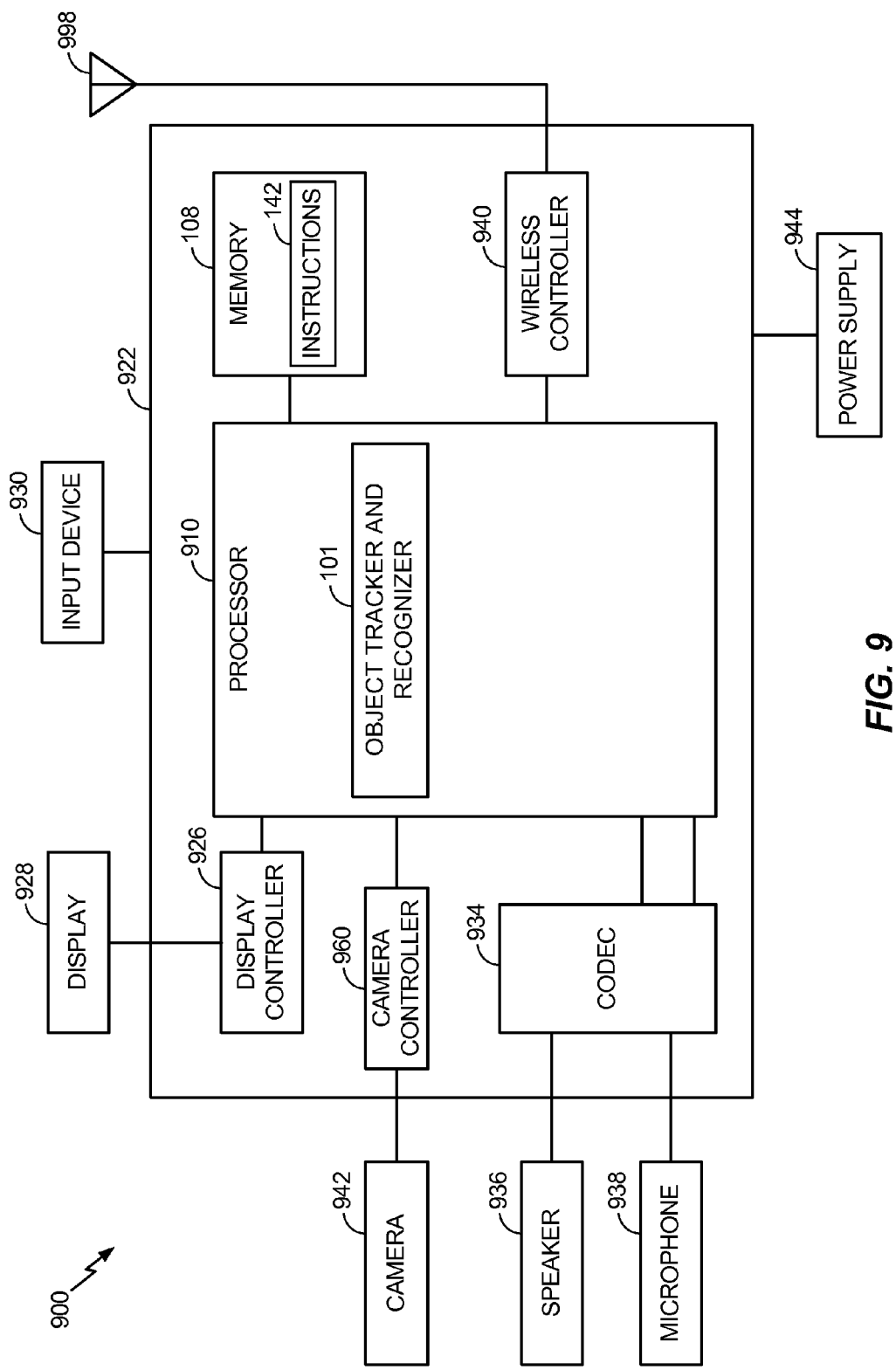
FIG. 9 is a block diagram of a particular embodiment of a wireless device including a processor operable to perform object tracking and processing.

Referring to FIG. 9, a block diagram of a particular illustrative embodiment of a wireless device including a processor operable to perform object tracking and processing is depicted and generally designated 900. The device 900 includes a processor, such as a processor 910, coupled to a memory 108. The processor 900 may include an object tracker and recognizer (e.g., the object tracker and recognizer 101 of FIG. 1). In an illustrative example, the object tracker and recognizer 101 may operate according to any one or more of FIGS. 4-8, or any combination thereof.

In a particular embodiment, the object tracker and recognizer 101 may be integrated into the processor 910 and may include dedicated circuitry or other logic to perform at least a portion of the functionality described with respect to FIGS. 1-3. In a particular embodiment, the memory 108 includes instructions 142 that may be executable by the processor 910 to cause the processor 910 to perform at least a portion of the functionality described with respect to any of FIGS. 1-8. For example, the instructions 142 may include instructions that are executable by a computer (e.g., the processor 910) to cause the computer to perform the method 700 of FIG. 7, the method 800 of FIG. 8, or any combination thereof.

In a particular embodiment, the object tracker and recognizer 101 may include a tracker (e.g., the tracker 114 of FIG. 1), a detector/recognizer (e.g., the detector/recognizer 124 of FIG. 1), and a temporal filter (e.g., the temporal filter 134 of FIG. 1). The tracker 114 may be configured to track object(s) (e.g., the object 151 of FIG. 1) in each of a plurality of frames of video data (e.g., the video data 160 of FIG. 1) to generate a tracking result. The detector/recognizer 124 may be configured to detect and recognize the object 151 in a single frame of the plurality of frames. The temporal filter 134 may be responsive to completion of the object detection and recognition performed by the detector/recognizer 124 and may be configured to combine a tracking result of the tracker 114 with an output of the object detection and recognition of the detector/recognizer 124 to produce a combined output 144 and to update state information of the object 151 based on the combined output 144. In a particular embodiment, the object 151 may correspond to a text box (e.g., the text box 152 including the text 153) and a location of the text box 152.

FIG. 9 illustrates a camera 942 that may be coupled to a camera controller 960 and that may provide image and/or video data to be processed by the object tracker and recognizer 101 to perform tracking and to perform object detection and recognition of an object (e.g., text) in video data received from the camera 942.

FIG. 9 also shows a display controller 926 that may be coupled to the processor 910 and to a display 928. A coder/decoder (CODEC) 934 (e.g., an audio and/or voice CODEC) may be coupled to the processor 910. A speaker 936 and a microphone 938 may be coupled to the CODEC 934. FIG. 9 also indicates that a wireless controller 940 may be coupled to the processor 910 and to a wireless antenna 998.

In a particular embodiment, the processor 910, the camera controller 960, the display controller 926, the memory 108, the CODEC 934, and the wireless controller 940 are included in a system-in-package or system-on-chip device 922.

In a particular embodiment, an input device 930 and a power supply 944 are coupled to the system-on-chip device 922. Moreover, in a particular embodiment, as illustrated in FIG. 9, the display 928, the camera 942, the input device 930, the microphone 938, the wireless antenna 998, and the power supply 944 are external to the system-on-chip device 922. However, each of the display 928, the camera 942, the input device 930, the speaker 936, the microphone 938, the wireless antenna 998, and the power supply 944 can be coupled to a component of the system-on-chip device 922, such as an interface or a controller.

It should be noted that although FIG. 9 depicts a wireless communications device, the processor 910 and the memory 108 may also be integrated into other devices, such as a multimedia player, an entertainment unit, a navigation device, a personal digital assistant (PDA), a fixed location data unit, or a portable computer (e.g., a laptop computer or a tablet computer). It should also be noted that although the processor 910 includes the object tracker and recognizer 101 of FIG. 1, in other embodiments the processor 910 may include the object tracer and detector 201 of FIG. 2 or the object tracker and recognizer 301 of FIG. 3.

In conjunction with the described embodiments, an apparatus is disclosed that includes means for tracking an object in each of a plurality of frames of video data to generate a tracking result. For example, the means for tracking may be the tracker 114 of FIGS. 1-4, the object tracker and recognizer 101 of FIGS. 1-3 and 9, one or more other devices configured to track an object in each of a plurality of frames of video data, or any combination thereof.

The apparatus may also include means for processing (e.g., means for detecting, means for recognizing, or any combination thereof) the object in a single frame of the plurality of frames. For example, the means for processing may be the detector/recognizer 124 of FIG. 1, the object detector 224 of FIG. 2, the object recognizer 324 of FIG. 3, the object tracker and recognizer 101 of FIG. 1, the object tracker and detector 201 of FIG. 2, or the object tracker and recognizer 301 of FIG. 3, one or more other devices configured to detect and/or recognize an object in a single frame of a plurality of frames, or any combination thereof.

The apparatus may include means for combining, in response to completion of the object processing (e.g. means for object detection and/or recognition) of the single frame, the tracking result of the means for tracking with an output of the means for object processing to produce a combined output. For example, the means for combining may be the temporal filter 134 of FIGS. 1-6, the object tracker and recognizer 101 of FIGS. 1-3 and 9, the Kalman filter 632 of FIG. 6, the maximum-likelihood estimator 634 of FIG. 6, one or more other devices configured to combine an output of the means for tracking with an output of the means for detecting and recognizing to produce a combined output, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in firmware, in a software module executed by a processor, or in a combination thereof. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), digital versatile disc (DVD) memory, floppy disk memory, Blu-ray disc memory, or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal. In alternate embodiments, programmable logic devices (PLDs), field programmable gate arrays (FPGAs), controllers, micro-controllers, and other electronic units may be used.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
tracking an object with respect to a plurality of frames of video data to generate a tracking result;
generating an output based on processing a subset of frames of the plurality of frames by an object processor, the object processor including an object detector or an object recognizer, wherein the object is tracked with respect to at least a first frame of the plurality of frames and a second frame of the plurality of frames and the output is generated based on processing the first frame of the plurality of frames; and
after generating the tracking result and the output, combining the tracking result with the output to produce a combined output.

2. The method of claim 1, wherein:
a plurality of tracking results including the tracking result are generated by a tracker at a first frequency which is different than a second frequency at which a plurality of outputs including the output are generated,
the tracking results and the outputs are combined at a temporal filter, and
the temporal filter is accessed asynchronously by the tracker and the object processor.

3. The method of claim 1, wherein: if the output is generated by performing object detection of the subset of frames, the subset of frames is selected based on a first latency of the object detector; and if the output is generated by performing object recognition of the subset of frames, the subset of frames is selected based on a second latency of the object recognizer.

4. The method of claim 1, wherein the subset of frames includes the first frame and the second frame of the plurality of frames.

5. The method of claim 1, wherein the subset of frames is selected based on a first latency of the object detector or a second latency of the object recognizer, the first latency corresponding to a period of time for a tracker to perform tracking with respect to at least two frames of the plurality of frames, and the second latency corresponding to a period of time for the object recognizer to process the first frame of the subset of frames.

6. The method of claim 1, further comprising updating state information of the object based on the output, motion history of the object, or any combination thereof.

7. The method of claim 1, wherein tracking the object and generating the output partially overlap in time.

8. The method of claim 7, wherein the object is tracked with respect to at least the first frame of the plurality of frames and the second frame of the plurality of frames while the output is generated based on processing the first frame of the plurality of frames.

9. The method of claim 7, wherein combining the tracking result with the output does not overlap in time with tracking the object to generate the tracking result, and wherein combining the tracking result with the output does not overlap in time with generating the output.

10. The method of claim 1, further comprising updating state information of the object based on the combined output, wherein the state information includes:
a location of the object; and
a definition of the object, a type of the object, historical data of the object, or any combination thereof.

11. The method of claim 1, further comprising updating state information of the object based on the combined output, wherein the object corresponds to a text box, and wherein the state information includes:
recognized text in the text box; and
a definition of the object, a type of the object, historical data of the object, or any combination thereof.

12. The method of claim 11, further comprising:
updating the state information, wherein the state information includes augmented content; and
displaying image content at least partially based on the state information at a display device of an image capture device.

13. The method of claim 1, wherein combining the tracking result with the output comprises integrating the tracking result with the output to obtain temporal information of the object.

14. The method of claim 13, wherein integrating the tracking result with the output comprises generating location information of the object based on the tracking result using at least one of a Kalman filter, a Particle filter, or an Extended Kalman filter.

15. The method of claim 13, wherein combining the tracking result with the output comprises integrating the tracking result with the output, and wherein integrating the tracking result with the output comprises generating identification information including text data of the object based on the output using at least one of a maximum-likelihood estimator or a maximum a posteriori estimator.

16. The method of claim 1, wherein the plurality of frames are generated by an image capture device, and wherein the image capture device comprises a camera, a video recording device, a wireless device, a portable electronic device, or any combination thereof.

17. The method of claim 1, further comprising:
prior to detecting a completion of object processing of the first frame of the subset of frames:
estimating motion of the object between the first frame and the second frame of the subset of frames; and
updating state information of the object based on the motion.

18. The method of claim 1, wherein the subset of frames is selected based on a first latency of the object detector or a second latency of the object recognizer, wherein the object is tracked by a tracker that has a third latency, wherein the third latency is less than the first latency, and wherein the third latency is less than the second latency.

19. The method of claim 1, wherein tracking the object is performed by a tracker to generate a particular tracking result that is not provided to the object processor, and wherein processing the subset of frames is performed by the object processor to generate a particular output that is not provided to the tracker.

20. An apparatus comprising:
a temporal filter;
a tracker configured to track an object with respect to each of a plurality of frames of video data to generate a tracking result and to provide the tracking result to the temporal filter; and
an object processor configured to process the object in a subset of frames of the plurality of frames to generate an output and to provide the output to the temporal filter, wherein the tracker is configured to track the object with respect to at least a first frame of the plurality of frames and a second frame of the plurality of frames and the object processor is configured to generate the output based on processing the first frame of the plurality of frames;
wherein the temporal filter is configured to receive the tracking result from the tracker, wherein the temporal filter is configured to receive the output from the object processor, and wherein the temporal filter is further configured to combine the tracking result and the output to produce a combined output.

21. The apparatus of claim 20, wherein the object processor includes:
an object detector configured to detect the object in the subset of frames; and
an object recognizer configured to recognize the object in the subset of frames.

22. The apparatus of claim 20, wherein the subset of frames is selected based on a latency of the object processor, and wherein the latency of the object processor corresponds to a period of time for the tracker to perform tracking with respect to at least two frames of the plurality of frames.

23. The apparatus of claim 20, wherein the temporal filter is further configured to update state information of the object, wherein the object corresponds to a text box, and wherein the state information includes recognized text in the text box and a location of the text box.

24. The apparatus of claim 23, wherein the temporal filter includes a Kalman filter and a maximum-likelihood estimator.

25. The apparatus of claim 24, wherein the Kalman filter is configured to determine a location of the text, and wherein the location of the text includes coordinates of the text box.

26. The apparatus of claim 24, wherein the maximum-likelihood estimator is configured to:
generate proposed text data via optical character recognition (OCR); and
access a dictionary to verify the proposed text data.

27. The apparatus of claim 26, wherein the proposed text data includes multiple text candidates and confidence data associated with the multiple text candidates, and wherein a particular text candidate corresponding to an entry of the dictionary is selected as verified text according to a confidence value associated with the text candidate.

28. An apparatus comprising:
means for tracking an object with respect to a plurality of frames of video data to generate a tracking result;
means for processing the object in a subset of frames of the plurality of frames to generate an output, wherein the means for tracking is configured to track the object with respect to at least a first frame of the plurality of frames and a second frame of the plurality of frames and the means for processing is configured to generate output based on processing the first frame of the plurality of frames; and
means for combining the tracking result of the means for tracking with the output of the means for processing to produce a combined output, wherein the means for combining is configured to receive the tracking result from the means for tracking, and wherein the means for combining is further configured to receive the output from the means for processing.

29. The apparatus of claim 28, wherein the means for processing the object in the subset of frames includes means for detecting the object in the subset of frames.

30. The apparatus of claim 28, wherein the means for processing the object in the subset of frames includes means for recognizing the object in the subset of frames.

31. The apparatus of claim 28, wherein the subset of frames is selected based on a latency of the means for processing, wherein the means for tracking performs tracking with respect to at least two frames of the plurality of frames during a first period of time, and wherein the latency corresponds to the first period of time.

32. The apparatus of claim 31, wherein the means for combining is configured to update state information of the object, wherein the object corresponds to a text box, and wherein the state information includes recognized text in the text box and a location of the text box.

33. The apparatus of claim 31, further comprising means for generating the plurality of frames and means for displaying image content at least partially based on state information of the object.

34. The apparatus of claim 28, wherein the means for combining includes a Kalman filter and a maximum-likelihood estimator.

35. A non-transitory computer-readable medium including program code that, when executed by a processor, causes the processor to perform operations including:
tracking an object with respect to a plurality of frames of video data to generate a tracking result;
generating an output based on processing a subset of frames of the plurality of frames by an object processor, the object processor including an object detector or an object recognizer, wherein the object is tracked with respect to at least a first frame of the plurality of frames and a second frame of the plurality of frames and the output is generated based on processing the first frame of the plurality of frames; and
after generating the tracking result and the output, combining the tracking result with the output to produce a combined output.

36. The non-transitory computer-readable medium of claim 35, wherein the subset of frames is selected based on a first latency of the object detector or a second latency of the object recognizer, wherein the output is generated by performing object detection of the object, and wherein the subset of frames is selected based on the first latency of the object detector.

37. The non-transitory computer-readable medium of claim 35, wherein the subset of frames is selected based on a first latency of the object detector or a second latency of the object recognizer, wherein the output is generated by performing object recognition of the object, and wherein the subset of frames is selected based on the second latency of the object recognizer.

38. The non-transitory computer-readable medium of claim 35, wherein the subset of frames is selected based on a first latency of the object detector or a second latency of the object recognizer, and wherein the first latency corresponds to a period of time for a tracker to perform tracking with respect to at least two frames of the plurality of frames.

39. The non-transitory computer-readable medium of claim 38, further comprising updating state information of the object based on the combined output, wherein the object corresponds to a text box, and wherein the state information includes recognized text in the text box and a location of the text box.

40. The non-transitory computer-readable medium of claim 35, further comprising program code that, when executed by the processor, causes the processor to integrate the tracking result with the output to obtain temporal information of the object.

41. A method comprising:
tracking a region that includes text with respect to a first frame of a plurality of frames of video data to generate a tracking result;
performing text processing on the first frame, wherein the text processing includes performing text recognition on detected text data by an object processor to generate recognized text data, wherein the region is tracked with respect to at least one of the first frame and a second frame of the plurality of frames and the recognized text data is generated based on processing the first frame of the plurality of frames; and after generating the tracking result and the recognized text data, combining the tracking result and the recognized text data to generate a combined output.

42. The method of claim 41, wherein performing the text processing on the first frame includes performing text detection on the first frame to identify the detected text data.

43. The method of claim 41, further comprising performing the text processing on the second frame of the plurality of frames to identify second recognized text data, wherein performing the text processing on the second frame includes performing text recognition on the second frame, and wherein the second frame is a frame immediately subsequent to the first frame.

44. The method of claim 41, further comprising updating state information of an object based on the combined output, wherein the object corresponds to a text box, and wherein the state information includes recognized text in the text box and a location of the text box.

45. The method of claim 41, wherein the region is tracked by a tracker that has a first latency, wherein the object processor has a second latency, and wherein the first latency is equal to the second latency.

* * * * *